United States Patent
Jung et al.

(10) Patent No.: US 10,887,146 B2
(45) Date of Patent: *Jan. 5, 2021

(54) DETERMINING A LOCATION OF A FREQUENCY-DOMAIN RESOURCE BLOCK

(71) Applicant: Motorola Mobility LLC, Chicago, IL (US)

(72) Inventors: Hyejung Jung, Palatine, IL (US); Ravikiran Nory, Buffalo Grove, IL (US); Vijay Nangia, Woodridge, IL (US); Ziad Ahmad, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,247

(22) Filed: Oct. 28, 2019

(65) Prior Publication Data

US 2020/0067754 A1 Feb. 27, 2020

Related U.S. Application Data

(63) Continuation of application No. 15/811,517, filed on Nov. 13, 2017, now Pat. No. 10,461,981.

(Continued)

(51) Int. Cl.
*H04L 27/26* (2006.01)
*H04L 5/00* (2006.01)
(Continued)

(52) U.S. Cl.
CPC ...... *H04L 27/2657* (2013.01); *H04J 11/0069* (2013.01); *H04L 5/0007* (2013.01);
(Continued)

(58) Field of Classification Search
CPC ............... H04L 27/2657; H04L 5/0007; H04L 27/2692; H04L 27/2613; H04L 27/2695; H04J 11/0069; H04W 24/10
See application file for complete search history.

(56) References Cited

U.S. PATENT DOCUMENTS 10,009,797 B2 * 6/2018 Zander ................. H04W 76/40
2013/0155883 A1 6/2013 Bhattacharjee et al.
(Continued)

OTHER PUBLICATIONS

Etri, "Remaining issues on NR frame structure", 3GPP TSG RAN WG1 Meeting #87, Nov. 14-18, 2016 pp. 1-4.
(Continued)

*Primary Examiner* — Tejis Daya
(74) *Attorney, Agent, or Firm* — Kunzler Bean & Adamson

(57) ABSTRACT

Apparatuses, methods, and systems are disclosed for determining a location of a frequency-domain resource block using frequency spacing values. One apparatus includes a transceiver that communicates with a base station in a mobile communication network a processor that determines a first spacing value for frequency locations within a frequency range and determines a second spacing value for frequency locations within the frequency range. The processor receives (via the transceiver) information of a first scalar and a second scalar and determines a location of a set of frequency-domain resource blocks using a location of a reference resource block. Here, the location of the reference resource block is based on the sum of a product of the first scalar and the first spacing value and a product of the second scalar and the second spacing value. The apparatus receives data from the base station on the set of frequency-domain resource blocks.

20 Claims, 10 Drawing Sheets

Related U.S. Application Data

(60) Provisional application No. 62/421,199, filed on Nov. 11, 2016.

(51) Int. Cl.
  H04J 11/00 (2006.01)
  H04W 24/10 (2009.01)

(52) U.S. Cl.
  CPC ...... *H04L 27/2613* (2013.01); *H04L 27/2692* (2013.01); *H04W 24/10* (2013.01); *H04L 27/2695* (2013.01)

(56) References Cited

U.S. PATENT DOCUMENTS

| | | | |
|---|---|---|---|
| 2013/0250818 A1* | 9/2013 | Gaal | H04J 11/0069 370/277 |
| 2014/0211753 A1 | 7/2014 | Choi et al. | |
| 2016/0066316 A1 | 3/2016 | Bhushan et al. | |
| 2017/0064743 A1 | 3/2017 | Lei et al. | |
| 2017/0094621 A1 | 3/2017 | Xu et al. | |
| 2017/0289965 A1 | 10/2017 | You et al. | |
| 2018/0139084 A1 | 5/2018 | Jung et al. | |
| 2018/0270008 A1 | 9/2018 | Yi et al. | |

OTHER PUBLICATIONS

NTT Docomo, Inc. "Frequency-domain aspects of frame structure", 3GPP TSG RAN WG1 Meeting #87, R1-1612714, Nov. 14-18, 2016, pp. 1-6.

Huawei, HiSilicon, "Frequency location of the synchronization signals", #GPP TSP RAN WG1 Meeting #87, R!-1611693, Nov. 14-18, 2016, pp. 1-6.

InterDigital Communications, "A Framework for Initial Access for NR", 3GPP TSG-RAN WG1 #87, R1-1612309, Nov. 14-18, 2016, pp. 1-6.

NTT Docomo, Inc. "Monitoring of DL control channel for NR", 3GPP TSG RAN WG1 Meeting #87, R1-1612716, Nov. 14-18, 2016, pp. 1-6.

PCT/US2017/061401, "Notification of Transmittal of the International Search Report and the Written Opinion of the International Searching Authority, or the Declaration", Feb. 26, 2018, pp. 1-12.

* cited by examiner

DETERMINING A LOCATION OF A FREQUENCY-DOMAIN RESOURCE BLOCK

CROSS-REFERENCE TO RELATED APPLICATIONS

This application claims priority to U.S. Provisional patent application Ser. No. 15/811,517 entitled "Determining a Location of a Frequency-Domain Resource Block" and filed on Nov. 13, 2017 for Hyejung Jung, Ravikiran Nory, Vijay Nangia, and Ziad Ahmad, which application claims priority U.S. Provisional Patent Application No. 62/421,199 entitled "Synchronization Signal for Diverse Communication Devices" and filed on Nov. 11, 2016 for Hyejung Jung, Ravikiran Nory, Vijay Nangia, and Ziad Ahmad, which applications are incorporated herein by reference.

FIELD

The subject matter disclosed herein relates generally to wireless communications and more particularly relates to determining a location of a frequency-domain resource block using frequency spacing values.

BACKGROUND

The following abbreviations and acronyms are herewith defined, at least some of which are referred to within the following description.

Third Generation Partnership Project ("3GPP"), Access and Mobility Management Function ("AMF"), Carrier Aggregation ("CA"), Clear Channel Assessment ("CCA"), Control Channel Element ("CCE"), Channel State Information ("CSI"), Common Search Space ("CSS"), Downlink Control Information ("DCI"), Downlink ("DL"), Enhanced Clear Channel Assessment ("eCCA"), Enhanced Mobile Broadband ("eMBB"), Evolved Node B ("eNB"), European Telecommunications Standards Institute ("ETSI"), Frequency Division Duplex ("FDD"), Frequency Division Multiple Access ("FDMA"), Hybrid Automatic Repeat Request ("HARQ"), Internet-of-Things ("IoT"), Licensed Assisted Access ("LAA"), Load Based Equipment ("LBE"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Master Information Block ("MIB"), Multiple Input Multiple Output ("MIMO"), Multipath TCP ("MPTCP"), Multi User Shared Access ("MUSA"), Narrowband ("NB"), Network Function ("NF"), Next Generation Node B ("gNB"), Physical Broadcast Channel ("PBCH"), Policy Control Function ("PCF"), Primary Synchronization Signal ("PSS"), Quality of Service ("QoS"), Quadrature Phase Shift Keying ("QPSK"), Radio Resource Control ("RRC"), Receive ("RX"), Resource Block ("RB"), Signal-to-Noise Ratio ("SNR"), Synchronization Signal ("SS"), Secondary Synchronization Signal ("SSS"), Scheduling Request ("SR"), Session Management Function ("SMF"), System Information Block ("SIB"), Transport Block ("TB"), Transport Block Size ("TB S"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/ Equipment (Mobile Terminal) ("UE"), Uplink ("UL"), Universal Mobile Telecommunications System ("UMTS"), Ultra-reliability and Low-latency Communications ("URLLC"), and Worldwide Interoperability for Microwave Access ("WiMAX").

In a mobile communication network, a channel raster is a set of equally spaced frequency locations in a given frequency band where a carrier frequency (i.e. a center of a channel bandwidth) can be placed. Moreover, a synchronization signal raster is a set of equally spaced frequency locations where a center of SS can be placed.

BRIEF SUMMARY

Methods for determining a location of a frequency-domain resource block using frequency spacing values are disclosed. Apparatuses and systems also perform the functions of the methods. In some embodiments, a method for determining a location of a frequency-domain resource block using frequency spacing values includes determining a first set of frequency locations within a frequency range and determining a second set of frequency locations within the frequency range. Here, adjacent frequency locations in the first set of frequency locations are spaced with a first spacing value and adjacent frequency locations in the second set of frequency locations are spaced with a second spacing value. The method includes determining a location of a frequency-domain resource block within the frequency range using the first and second spacing values and communicating data on the frequency-domain resource block using the calculated location of the resource block.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
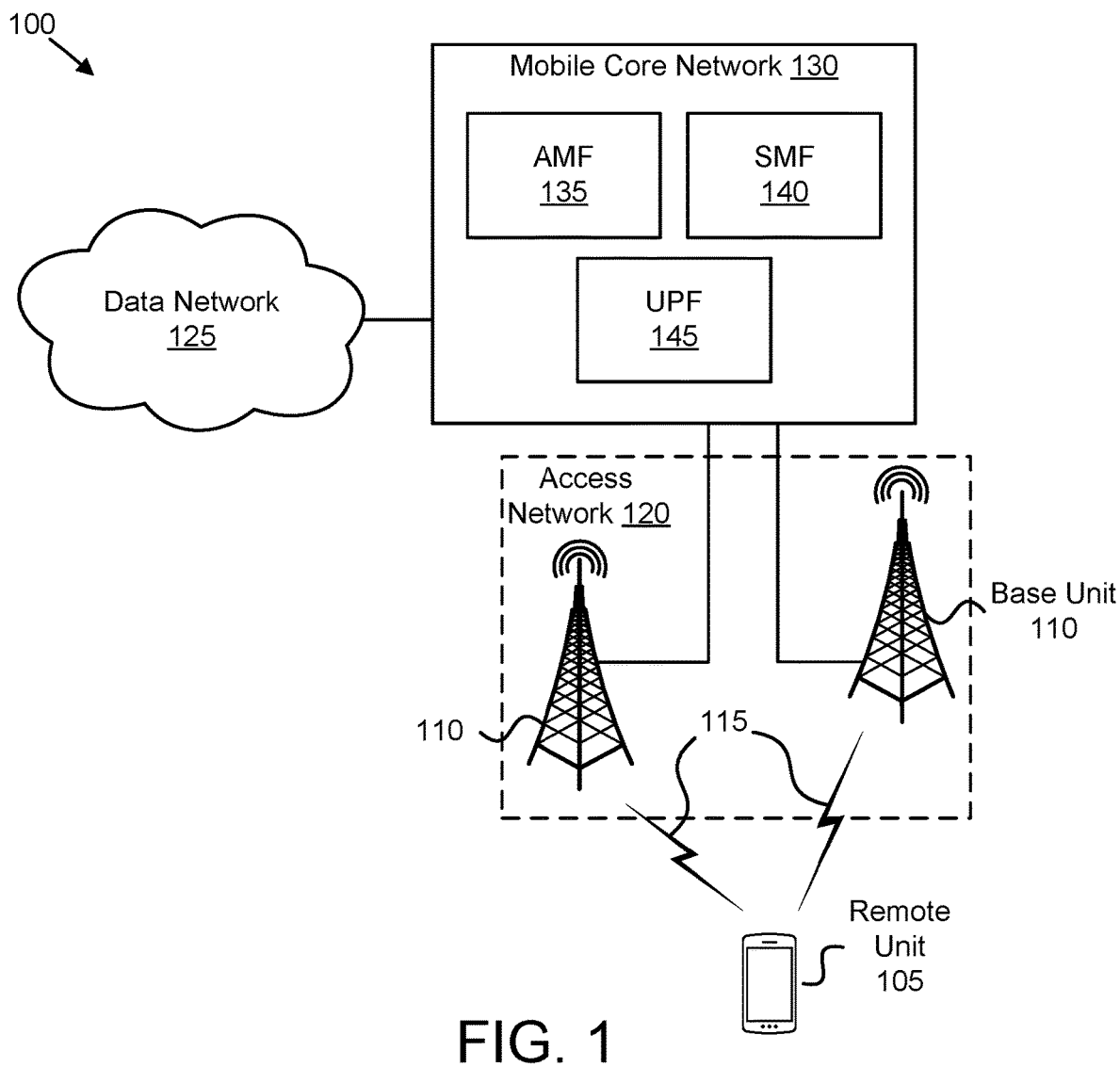
FIG. 1 is a schematic block diagram illustrating one embodiment of a wireless communication system for determining a location of a frequency-domain resource block using frequency spacing values.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 depicts a wireless communication system 100 for determining a location of a frequency-domain resource block using frequency spacing values, according to embodiments of the disclosure. In one embodiment, the wireless communication system 100 includes at least one remote unit 105, an access network 120 containing at least one base unit 110, wireless communication links 115, and a mobile core network 130. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more WLAN (e.g., Wi-Fi™) access points.

In one implementation, the wireless communication system 100 is compliant with the fifth generation ("5G") system specified in the 3GPP specifications (e.g., "5G NR"). More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 130 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number of AMFs 135, SMFs 140, and UPFs 145 may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

The access network 120 supports a larger minimum channel bandwidth (e.g., 5 MHz) than the minimum channel bandwidth of LTE (1.4 MHz). Accordingly, the base units 110 may transmit a wider (e.g., larger bandwidth) SS than the transmission bandwidth of LTE PSS and SSS (e.g., 1.08 MHz including guard subcarriers). For a given subcarrier spacing of SS and a given per-subcarrier signal-to-noise ratio ("SNR"), a wider transmission bandwidth of SS with a longer sequence results in better SS detection performance because of lower cross-correlation among SS sequences and higher spreading gain. Furthermore, wideband SS (e.g., the transmission bandwidth of which is larger than 1.08 MHz for 15 KHz subcarrier spacing in frequency bands below 6 GHz) is necessary to provide a certain minimum relative timing accuracy with respect to symbol duration, if a larger subcarrier spacing (e.g., 30 kHz or 60 kHz) is configured for data/control channels.

In some embodiments, the base unit 110 constructs and transmits a wideband SS suitable to serve mixed traffics with different service requirements and various capabilities. For example, certain remote units 105 may be bandwidth limited and only able to receive narrowband SS, such as the conventional LTE PSS/SSS. Such band-limited remote units 105 may include low-cost massive machine-type communication ("mMTC") UEs. Additionally, other remote units 105 may be capable of receiving wideband SS. Such non-band-limited UEs may include enhanced mobile broadband (eMBB) UEs. To serve both types of remote units, the wideband SS disclosed herein is receivable by both types of remote units, thus providing efficient radio resource utilization.

Moreover, the base unit 110 may indicate a reference frequency location, such as a starting, ending, or center of a resource allocation, using the frequency spacing of a channel raster and an SS raster. In certain embodiments, the SS raster is defined with a larger frequency spacing than the frequency spacing of the channel raster.

Figure 2:
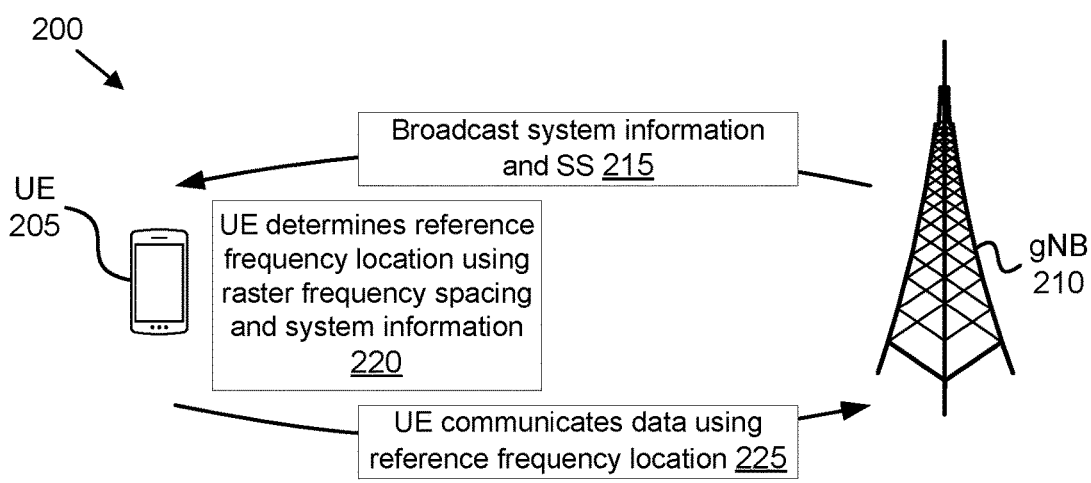
FIG. 2 is a block diagram illustrating one embodiment of a network architecture for determining a location of a frequency-domain resource block using frequency spacing values.

FIG. 2 depicts a network architecture 200 used for determining a location of a frequency-domain resource block using frequency spacing values, according to embodiments of the disclosure. The network architecture 200 may be a simplified embodiment of the wireless communication system 100. As depicted, the network architecture 200 includes a UE 205 that detects synchronization signals ("SS") transmitted by a gNB 210. Here, the UE 205 may be one embodiment of the remote unit 105 and the gNB 210 may be one embodiment of the base unit 110, described above.

As depicted, the gNB 210 broadcasts system information and SS (see block 215). The UE 205 performing cell search detects the SS and receives the system information. In some embodiments, the UE 205 searches a channel raster and/or SS raster to detect the SS and receive the system information. The UE 205 uses the raster frequency spacing in combination with the received system information to identify a reference frequency location, such as a particular resource block. Specifically, the system information may include information elements k and l, where $$k = \left\lfloor \frac{f_c - f_s}{\Delta F_s} \right\rfloor,$$ (Equation 1)

$$l = \left\lfloor \frac{\mathrm{mod}((f_c - f_s), \Delta F_s)}{\Delta F_c} \right\rfloor,$$ (Equation 2)

In the above equations, $f_c$ is a reference frequency, $f_s$ is a frequency location of the detected SS signal, and $\Delta F_c$ is a frequency spacing for the channel raster, and $\Delta F_s$ is a frequency spacing for the SS raster. The operator $\lfloor X \rfloor$ in Equations 1 and 2 denotes rounding the value X to the nearest integer towards minus infinity. The gNB 210 identifies the reference frequency $f_c$ to indicate to the UE 205 and then calculates the values of k and l according to equations 1 and 2. The gNB 210 includes the values of k and l as information elements in the system information.

Generally, the UE 205 is configured with values for $\Delta F_s$ and $\Delta F_c$. In some embodiments, $\Delta F_s$ is a predefined for the frequency range. Additionally, $\Delta F_c$ may be predefined per frequency range or may be configured and signaled by the network. For example, the particular value of $\Delta F_c$ may be based on a spectrum band used by the gNB 210 and/or a geographic region where the gNB 210 is located.

Upon receiving the information elements k and l, the UE 205 determines the reference frequency $f_c$ using the following equation:

$$f_c = \Delta F_s \cdot k + \Delta F_c \cdot l + f_s$$ (Equation 3)

In some embodiments, the gNB 210 allocates a frequency-domain resource to the UE 205 by indicating frequency-domain resource unit, (e.g. a resource block ("RB")) using the raster spacing values and the information elements k and l. Moreover, the reference frequency location may indicate a starting or ending RB for the allocation to the UE 205. In one embodiment, the UE 205 has an operating bandwidth which is equal to or smaller than a channel bandwidth, with the operating bandwidth being defined in terms of number of RBs with the information elements k and l indicating a starting or ending RB. If an RB bandwidth is a multiple of $\Delta F_c$, a starting/ending frequency location of allocated RBs for UE's operating band can be indicated with the above two information elements k and l. If the RB bandwidth is a multiple of $2 \cdot \Delta F_c$, a center of the allocated RBs can be indicated with the information elements k and l.

For example, parameters can be set as follows: $\Delta f = 15$ kHz, $\Delta F_s = 48 \cdot \Delta f = 720$ kHz, $\Delta F_c = 6 \cdot \Delta f = 90$ kHz, and 1 RB = $2 \cdot \Delta F_c = 12 \cdot \Delta f = 180$ kHz for the frequency range below 6 GHz. This parameter configuration makes a frequency spacing of the SS raster (720 kHz) to be a multiple of the RB bandwidth (180 kHz), which makes it easier to fit the SS within a certain number of RBs. Furthermore, the frequency spacing of the SS raster is larger than the frequency spacing of the channel raster for faster cell search, and yet it is small enough to accommodate wideband SS (e.g. SS bandwidth of 3.6 MHz) in the minimum channel bandwidth (e.g. 5 MHz).

The above examples assume that the reference frequency is a frequency location in the serving cell of the UE 205. However, in other embodiments, the reference frequency may be a frequency location in a neighboring cell. Here, the gNB 210 may point to a SS location in the neighboring cell. Where the SS raster of the serving cell and the SS raster of the neighboring cell share the same frequency locations, then the gNB 210 only needs to signal the information element k, where the UE 205 determines the SS frequency location in the neighboring cell using the below equation:

$$f_c = \Delta F_s \cdot k + f_s$$ (Equation 4)

However, if the SS frequency location in the neighboring cell is not a member of the SS raster in the serving cell (but is a member of the channel raster), then the gNB 210 must signal both information elements k and l and the UE 205 determines the SS frequency location in the neighboring cell (e.g., the reference frequency $f_c$) using Equation 3.

Figure 3:
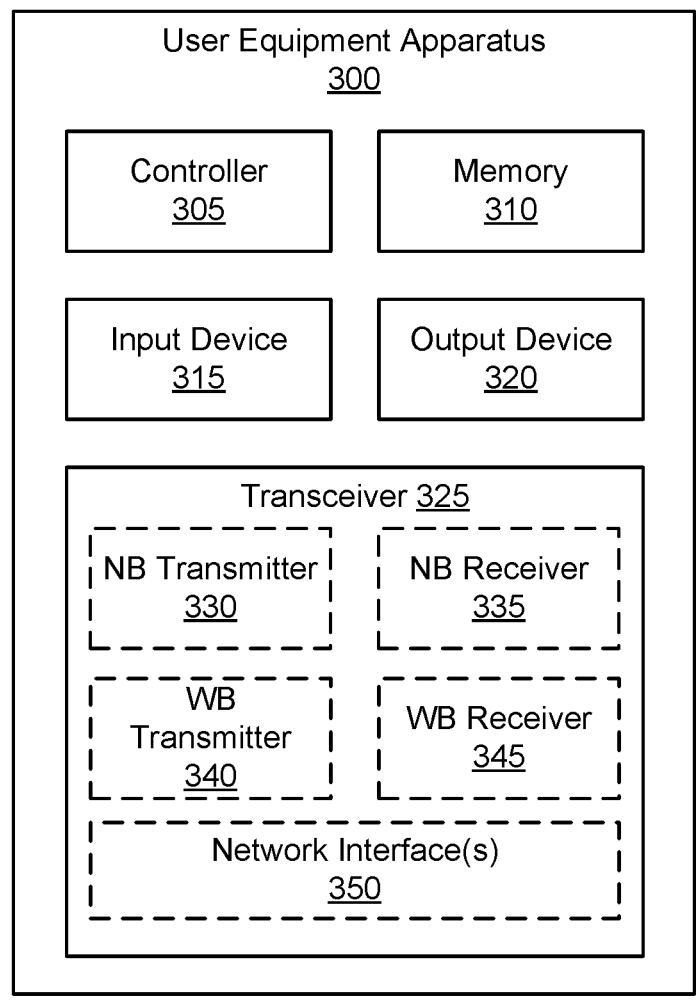
FIG. 3 is a schematic block diagram illustrating one embodiment of a user equipment apparatus for determining a location of a frequency-domain resource block using frequency spacing values.

FIG. 3 depicts one embodiment of a user equipment apparatus 300 that may be used for determining a location of a frequency-domain resource block using frequency spacing values, according to embodiments of the disclosure. The user equipment apparatus 300 may be one embodiment of the remote unit 105 and/or UE 205. Furthermore, the user equipment apparatus 300 may include a processor 305, a memory 310, an input device 315, a display 320, and a transceiver 325. In some embodiments, the input device 315 and the display 320 are combined into a single device, such as a touch screen. In certain embodiments, the user equipment apparatus 300 may not include any input device 315 and/or display 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 determines a first set of frequency locations within a frequency range. Here, adjacent frequency locations in the first set of frequency locations are spaced with a first spacing value. Additionally, the processor 305 determines a second set of frequency locations within the same frequency range. Here, adjacent frequency locations in the second set of frequency locations are spaced with a second spacing value.

The first spacing value is larger than the second spacing value. In one embodiment, the first set of frequency locations is a set of potential locations for detecting a synchronization signal (e.g., a SS raster). In another embodiment, the second set of frequency locations is a set of carrier raster locations within the frequency range (e.g., a channel raster). In certain embodiments, the first and second spacing values depend on a location of the frequency range within a wireless spectrum and/or on a geographical area of operation. In other embodiments, the second spacing value is a network configured value, the transceiver 325 receiving the second spacing value from the network.

Having determined the first and second spacing values, the processor 305 calculates a location of a frequency-domain resource block within the frequency range using the first spacing value and the second spacing value. For example, the processor 305 may use received system information elements in combination with the spacing values to calculate the frequency-domain resource block location. Moreover, the processor 305 controls the transceiver 325 to communicate (e.g., receive or transmit) data on the frequency-domain resource block using the calculated location of the resource block.

In certain embodiments, the determined location of a frequency-domain resource block is a starting frequency location of a resource allocation to the user equipment apparatus 300. Here, the determined location indicates the beginning resource block ("RB") of the allocation (in order of increasing frequency). In certain embodiments, the determined location of a frequency-domain resource block is an ending frequency location of a resource allocation to the user equipment apparatus 300. Here, the determined location indicates the last resource block ("RB") of the allocation (in order of increasing frequency). In certain embodiments, the processor 305 determines a resource allocation based on the location of the frequency-domain resource block, where determined location indicates a center of the allocation.

In some embodiments, the processor 305 determines the location of the frequency-domain resource block by determining a resource block index for the frequency-domain resource block. In such embodiments, communicating data on the frequency-domain resource block includes the transceiver communicating data on the frequency-domain resource block using the location of the determined resource block index. For example, the transceiver 325 may receive data from the base unit on the indicated frequency-domain resource block.

In some embodiments, the processor 305 (in conjunction with the transceiver 325) detects a synchronization signal ("SS") at a first frequency location in the first set of frequency locations. Moreover, the processor 305 may further control the transceiver 325 to receive a wideband SS burst with a wideband receiver 345. The wideband SS burst includes a first narrowband SS burst and an additional SS burst in frequency.

The base unit 110 (e.g., a gNB) transmits the wideband SS burst with a first periodicity. Accordingly, the transceiver 325 receives the wideband SS burst according to the first periodicity. In some embodiments, the transceiver 325 further receives the first narrowband SS burst with a second periodicity shorter than the first periodicity. Here, the base unit 110 transmits one or more narrowband SS bursts between successive wideband SS bursts.

In certain embodiments, receiving the first narrowband SS burst with the second periodicity includes the transceiver 325 receiving a modified first narrowband SS burst whenever the first narrowband SS burst is transmitted without the additional SS burst. In such embodiments, the first narrowband SS burst is modified by (e.g., the base unit 110) applying a different scrambling code to a SS in the first narrowband SS burst and/or applying a cyclical shift to a SS in the first narrowband SS burst. The modified narrowband SS burst is also referred to herein as a "second" narrowband SS burst. In various embodiments, the second (e.g., modified) narrowband SS burst has a higher power spectral density than the first (e.g., non-modified) narrowband SS burst transmitted as part of the wideband SS burst.

In some embodiments, the processor 305 detects a cell based on the first narrowband SS burst and/or the wideband SS burst. In certain embodiments, the wideband SS burst includes at least one of: a wideband primary SS ("PSS"), a wideband secondary SS ("SSS"), and a physical broadcast channel ("PBCH") carrying a master information block ("MIB") message. In certain embodiments, the first narrowband SS burst includes at least one of: a narrowband primary SS ("PSS"), a narrowband secondary SS ("SSS"), and a physical broadcast channel ("PBCH") carrying a master information block ("MIB") message.

In certain embodiments, the processor 305 further decodes system information from a broadcast channel. Moreover, the processor 305 may determine a frequency offset from the system information. In such embodiments, determining the location of the frequency-domain resource block includes using the frequency offset. Specifically, the frequency offset may be calculated by the equation: $\Delta F_1 \cdot k + \Delta F_2 \cdot l$, where $\Delta F_1$ is the first spacing value, $\Delta F_2$ is the second spacing value, and k and l are information elements included in the system information. Here, the reference frequency is a location the frequency offset away from the frequency on which SS (or the broadcast channel) is received.

In some embodiments, the processor 305 determines a first spacing value for frequency locations within a frequency range and determines a second spacing value for frequency locations within the frequency range. Moreover, the processor 305 receives (e.g., via the transceiver 325) information of a first scalar and a second scalar. The processor 305 determines a location of a set of frequency-domain resource blocks using a location of a resource block and receives data from a base station on the set of frequency-domain resource blocks. Here, the location of the resource block is based on the sum of a product of the first scalar and the first spacing value and a product of the second scalar and the second spacing value.

In certain embodiments, wherein the first spacing value corresponds to a set of potential locations for detecting a synchronization signal and wherein the second spacing value corresponds to a set of carrier raster locations within the frequency range. In certain embodiments, the processor 305 decodes system information from a broadcast channel, wherein the first spacing value and second spacing value are indicated by a master information block of the system information.

In certain embodiments, the processor 305 detects a synchronization signal, determines a frequency location of the detected synchronization signal, and determines a frequency offset from system information decoded from a broadcast channel. In such embodiments, the frequency offset may be calculated by, $\Delta F_1 \cdot k + \Delta F_2 \cdot l$, where $\Delta F_1$ is the first spacing value, $\Delta F_2$ is the second spacing value, k is the first scalar, and l is the second scalar, wherein information of k and l is indicated by the system information and wherein the location of the resource block is calculated by applying the frequency offset to the determined frequency location.

In certain embodiments, the resource block corresponds to a resource block with a smallest resource block index value of the set of frequency-domain resource blocks. In certain embodiments, the first spacing value is larger than the second spacing value, and wherein the first and second spacing values depend on one of: a location of the frequency range within a wireless spectrum and a geographical area of operation. In certain embodiments, the second spacing value is a network-configured value, the transceiver receiving the second spacing value from the network.

In some embodiments, the first spacing value is based on a reference subcarrier spacing for the frequency range. In such embodiments, the processor 305 decodes system information from a broadcast channel, wherein the second spacing value and second scalar are indicated by a master information block of the system information. In further embodiments, the first scalar may correspond to a frequency offset value between a reference frequency location and a frequency location associated with a synchronization signal, wherein the first scalar value is a network-configured value.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to determining a location of a frequency-domain resource block using frequency spacing values. For example, the memory 310 may store channel raster information, SS raster information, system information, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with one or more base units 110 in a mobile communication network. Via a base unit 110, the transceiver 325 may communicate with one or more network functions in the mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages.

As depicted, the transceiver 325 may include one or more narrowband transmitters 330 and one or more narrowband receivers 335. The transceiver 325 may also include one or more wideband transmitters 340 and one or more wideband receivers 345. Although only one NB transmitter/receiver set and one WB transmitter/receiver set are illustrated, the user equipment apparatus 300 may have any suitable number of NB transmitters 330, NB receivers 335, WB transmitters 340, and WB receivers 345. Further, the transmitter(s) 330/340 and the receiver(s) 335/345 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330/340, and receivers 335/345 may be implemented as physically separate components that access a shared hardware resource and/or software resource, such as for example, the network interface 350.

In various embodiments, one or more transmitters 330/340 and/or one or more receivers 335/345 may be implemented and/or integrated into a single hardware component, such as a multi-transceiver chip, a system-on-a-chip, an ASIC, or other type of hardware component. In certain embodiments, one or more transmitters 330/340 and/or one or more receivers 335/345 may be implemented and/or integrated into a multi-chip module. In some embodiments, other components such as the network interface 350 or other hardware components/circuits may be integrated with any number of transmitters 330/340 and/or receivers 335/345 into a single chip. In such embodiment, the transmitters 330/340 and receivers 335/345 may be logically configured as a transceiver 325 that uses one more common control signals or as modular transmitters 330/340 and receivers 335/345 implemented in the same hardware chip or in a multi-chip module.

Figure 4:
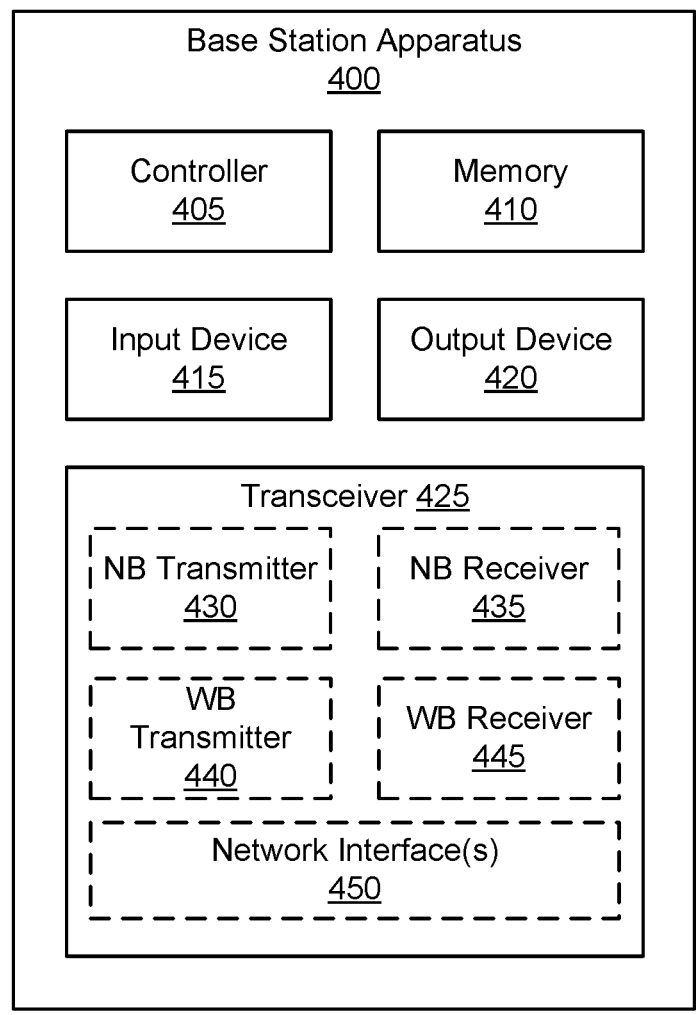
FIG. 4 is a schematic block diagram illustrating one embodiment of a base station apparatus for determining a location of a frequency-domain resource block using frequency spacing values.

FIG. 4 depicts one embodiment of a base station apparatus 400 that may be used for determining a location of a frequency-domain resource block using frequency spacing values, according to embodiments of the disclosure. The base station apparatus 400 may be one embodiment of the base unit 110 and/or gNB 210. Furthermore, the base station apparatus 400 may include a processor 405, a memory 410, an input device 415, a display 420, and a transceiver 425. In some embodiments, the input device 415 and the display 420 are combined into a single device, such as a touch screen. In certain embodiments, the base station apparatus 400 may not include any input device 415 and/or display 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 identifies a first set of frequency locations within a frequency range. In one embodiment, the first set of frequency locations is a set of potential locations for the remote unit 105 to detect a synchronization signal. Adjacent frequency locations in the first set of frequency locations are spaced with a first spacing value, $\Delta F_1$. The first set of frequency locations and the first spacing value may depend on a location of the frequency range within a wireless spectrum and/or on a geographical area of operation.

Additionally, the processor 405 identifies a second set of frequency locations within the same frequency range. In one embodiment, the second set of frequency locations is a set of carrier raster locations within the frequency range. Adjacent frequency locations in the second set of frequency locations are spaced with a second spacing value. The first spacing value is larger than the second spacing value.

In certain embodiments, the second set of frequency locations and the second spacing value may depend on a location of the frequency range within a wireless spectrum and/or on a geographical area of operation. In other embodiments, the second spacing value is a network configured value. Here, the processor 405 controls the transceiver 425 to send the second spacing value to the remote unit 105.

The combination of first spacing value and second spacing value are used to indicate a location of a frequency-domain resource block within the frequency range. The transceiver 425 receives data from the remote unit 105 on the resource block. In some embodiments, the first spacing value and second spacing value are used to indicate a starting location of the frequency-domain resource block. In other embodiments, the first spacing value and second spacing value are used to indicate an ending location of the frequency-domain resource block. In yet other embodiments, the first spacing value and second spacing value are used to indicate a resource block index for the frequency-domain resource block.

In certain embodiments, the processor 405 provides (e.g., to the remote unit 105) information elements for determining the location of a frequency-domain resource block using the system information. The remote unit 105 then decodes system information from a broadcast channel to determine the location of the frequency-domain resource block. In such embodiments, indicating the target frequency location includes using the frequency offset. Specifically, the frequency offset may be calculated by the equation: $\Delta F_1 \cdot k + \Delta F_2 \cdot l$, where $\Delta F_1$ is the first spacing value (e.g., the SS raster spacing value), $\Delta F_2$ is the second spacing value (e.g., the channel raster spacing value), and k and l are information elements included in the system information. In one embodiment, the frequency offset is applied to the frequency on which the system information is transmitted to yield the target frequency. Here, the processor 405 selects the values of k and l needed to indicate the target frequency location, for example using Equations 1 and 2.

In some embodiments, the processor 405 (in conjunction with the transceiver 425) transmits a synchronization signal ("SS") at a first frequency location in the first set of frequency locations. Moreover, the processor 405 may further control the transceiver 425 to transmit a wideband SS burst. Here, the wideband SS burst includes a first narrowband SS burst and an additional SS burst in frequency.

In certain embodiments, the processor 405 controls the transceiver 425 to transmit the wideband SS burst with a first periodicity. In some embodiments, the transceiver 425 further controls the transceiver 425 to transmit the first narrowband SS burst with a second periodicity shorter than the first periodicity. Accordingly, the transceiver 425 transmits one or more narrowband SS bursts between successive wideband SS bursts.

In certain embodiments, transmitting the first narrowband SS burst includes the processor 405 modifying the first narrowband SS burst to form a second narrowband SS burst. In such embodiments, the transceiver 425 transmits the second (e.g., modified) narrowband SS burst whenever the narrowband SS burst is transmitted without the additional SS burst (e.g., whenever not part of the wideband SS burst).

For example, if the second periodicity is half the value of the first periodicity, the then transceiver 425 transmits the wideband SS burst containing the first (unmodified) narrowband SS burst, then transmits the second (modified) narrowband burst without the additional SS burst, again transmits the wideband SS burst containing the first narrowband SS burst, etc.

In some embodiments, the processor 405 modifies the first narrowband SS burst by applying a different scrambling code to a SS in the first narrowband SS burst and/or by applying a cyclical shift to a SS in the first narrowband SS burst. In various embodiments, the second (e.g., modified) narrowband SS burst has a higher power spectral density than the first (e.g., non-modified) narrowband SS burst transmitted as part of the wideband SS burst. In certain embodiments, the wideband SS burst includes at least one of: a wideband primary SS ("PSS"), a wideband secondary SS ("SSS"), and a physical broadcast channel ("PBCH") carrying a master information block ("MIB") message. In certain embodiments, the first narrowband SS burst includes at least one of: a narrowband primary SS ("PSS"), a narrowband secondary SS ("SSS"), and a physical broadcast channel ("PBCH") carrying a master information block ("MIB") message.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to determining a location of a frequency-domain resource block using frequency spacing values. For example, the memory 410 may store channel raster information, SS raster information, system information, and the like. In certain embodiments, the memory 410 also stores program code and related data, such as an operating system or other controller algorithms operating on the base station apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more remote units 105 operating in a mobile communication network. The transceiver may also communicate with one or more network functions in the mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. As depicted, the transceiver 425 may include one or more narrowband transmitters 430 and one or more narrowband receivers 435. The transceiver 425 may also include one or more wideband transmitters 440 and one or more wideband receivers 445. Additionally, the transceiver 425 may support one or more network interfaces 450 for communicating with the remote unit 105 and/or the mobile core network 130.

Figure 5:
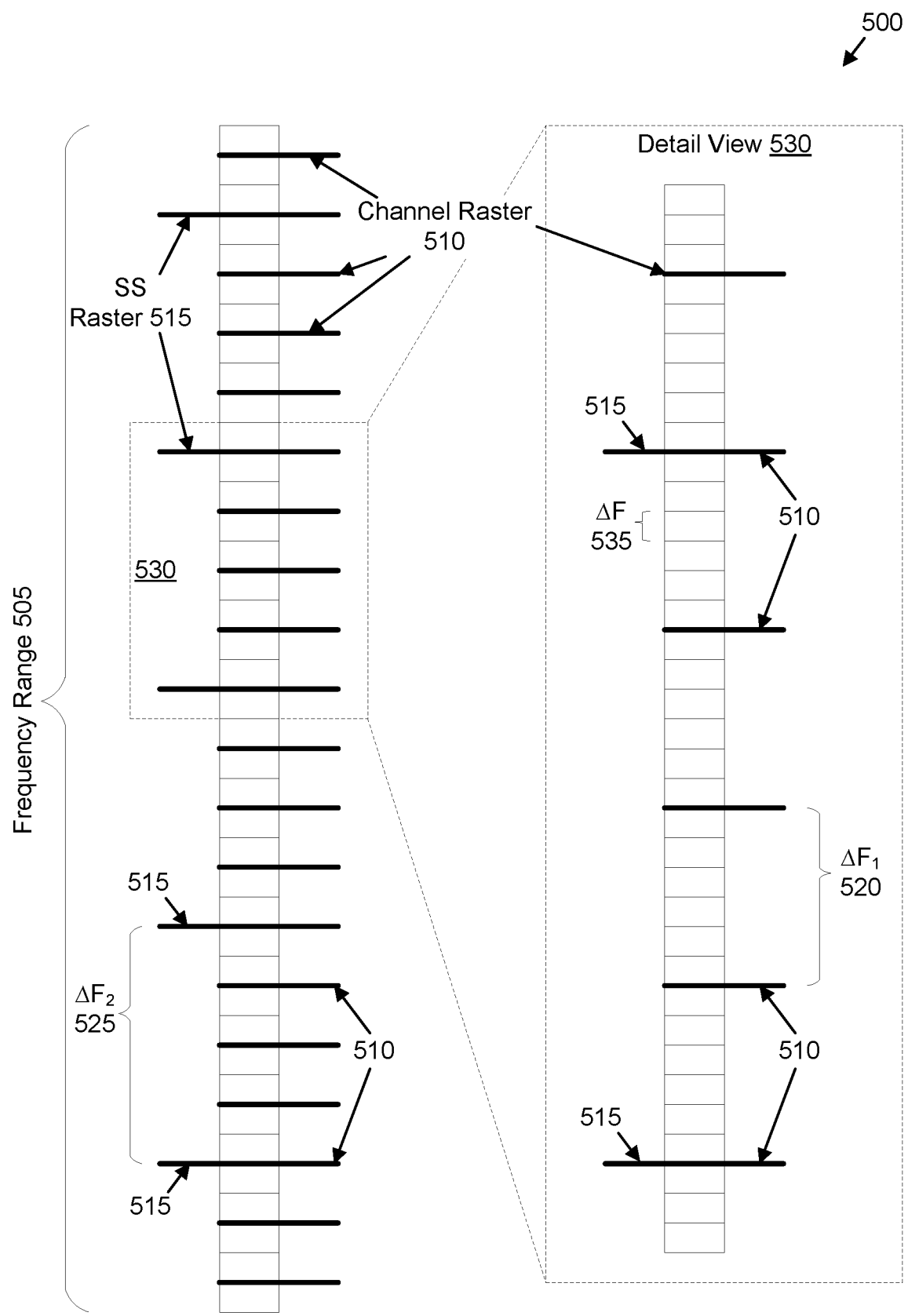
FIG. 5 is a block diagram illustrating one embodiment of a channel raster and a SS raster used for determining a location of a frequency-domain resource block using frequency spacing values.

FIG. 5 depicts a frequency resource grid 500 which may be used in a 5G radio network for determining a location of a frequency-domain resource block using frequency spacing values, according to embodiments of the disclosure. The resource grid 500 includes a plurality of subcarriers over the frequency range 505 (e.g., a frequency band), the subcarriers grouped into resource blocks. FIG. 5 depicts a channel raster 510, a set of equally spaced frequency locations in the frequency range 505 where a carrier frequency (e.g., a center of a channel bandwidth) may be placed. The frequency-spacing value (e.g., the difference between adjacent frequencies) for the channel raster 510 is depicted as $\Delta F_1$ 520.

FIG. 5 further depicts a synchronization signal ("SS") raster 515, a set of equally spaced frequency locations in the frequency range 505 where the center of a synchronization signal (e.g., PSS or SSS) may be placed. The frequency-spacing value (e.g., the difference between adjacent frequencies) for the SS raster 515 is depicted as $\Delta F_2$ 525. Here, the SS raster 515 has a larger frequency spacing than the frequency spacing of the channel raster 510, this facilitating faster cell search (e.g., $\Delta F_2 > \Delta F_1$). Moreover, the SS raster 515 is sparser than the channel raster 510.

As depicted, the SS raster 515 is a subset of the channel raster 510. As such, each frequency location in the SS raster 515 is also a frequency location in the channel raster 510. However, in other embodiments the SS raster 515 is not a subset of the channel raster 510. Moreover, in certain embodiments the center of a synchronization signal may not coincide with the center of the channel bandwidth (e.g., a frequency location of the carrier frequency), regardless of whether or not the SS raster is a subset of the channel raster. Further, possible relative locations of SS with respect to the carrier frequency within the channel bandwidth may change based on the placement of the carrier frequency.

The detail view 530 shows the relationship between the SS raster 515 and the channel raster 510 in greater detail, also depicted is a subcarrier frequency-spacing value (depicted as ΔF) 535. The subcarrier spacing may also be referred to as the "numerology" for the frequency range 505 and the subcarrier frequency-spacing value 535 may depend on a frequency band in which the frequency range 505 is located. For example, subcarriers spacing of 15 kHz, 30 kHz, and 60 kHz for frequency bands below 6 GHz and subcarrier spacing of 120 kHz, 240 kHz, and 480 kHz for frequency bands above 20 GHz.

As discussed above, the combination of the channel raster frequency-spacing value 520 and the SS raster frequency-spacing value 525 may be used to indicate a reference frequency location. Also, the gNB 210 may include two information elements k and l in the MIB, where k and l are used along with the frequency-spacing values 520 and 525 to define the reference frequency location, for example using Equations 3 or 4. Recall that the channel raster frequency-spacing value 520 and the SS raster frequency-spacing value 525 are used as multipliers of k and l to define the reference frequency location.

Note that setting the channel raster frequency-spacing value 520 and the SS raster frequency-spacing value 525 as multiples of the subcarrier frequency-spacing value 535 provides full-flexibility of channel deployment for the configured channel raster 510. For example, if the channel raster frequency-spacing value 520 is 100 kHz and the SS raster frequency-spacing value 525 is 600 kHz, but the subcarrier frequency-spacing value 535 is 15 kHz, then in this scenario there are some frequency locations in the channel raster 510 that may not be usable due to frequency distances between the center of synchronization signal and carrier frequencies not being multiples of subcarrier spacing.

In contrast, if the channel raster frequency-spacing value 520 is 120 kHz, the SS raster frequency-spacing value 525 is 600 kHz, and the subcarrier frequency-spacing value 535 is 15 kHz, then in this scenario there all frequency locations in the channel raster 510 are multiples of subcarrier spacing away from the center of synchronization signal. In certain embodiments, the UE 205 is configured to apply fractional frequency shifting (i.e. frequency shifting of a fraction of subcarrier spacing) so that all frequency locations in the channel raster 510 are usable despite the channel raster frequency-spacing value 520 and/or the SS raster frequency-spacing value 525 not being a multiple of the subcarrier frequency-spacing value 535.

The reference frequency location may be a carrier frequency, a center location of the UE's operating band, a starting frequency location of the UE's operating band, an ending frequency location of the UE's operating band, or a center of SS for a neighboring cell. Alternatively, the reference frequency location may be reference point for determining a center resource block among a set of resource blocks.

In various embodiments, the gNB 210 indicates the meaning of the reference frequency (e.g., what the reference frequency location references) or indicates the reference frequency in a pre-defined field of a message, wherein the pre-defined field of the message is associated with the meaning of the reference frequency. This indication may be communicated via a broadcast channel (e.g., via MIB), as downlink control information ("DCI") in a downlink physical control channel (e.g., PDCCH), or via a common (or dedicated) higher-layer signaling (e.g., via RRC signaling).

Figure 6A:
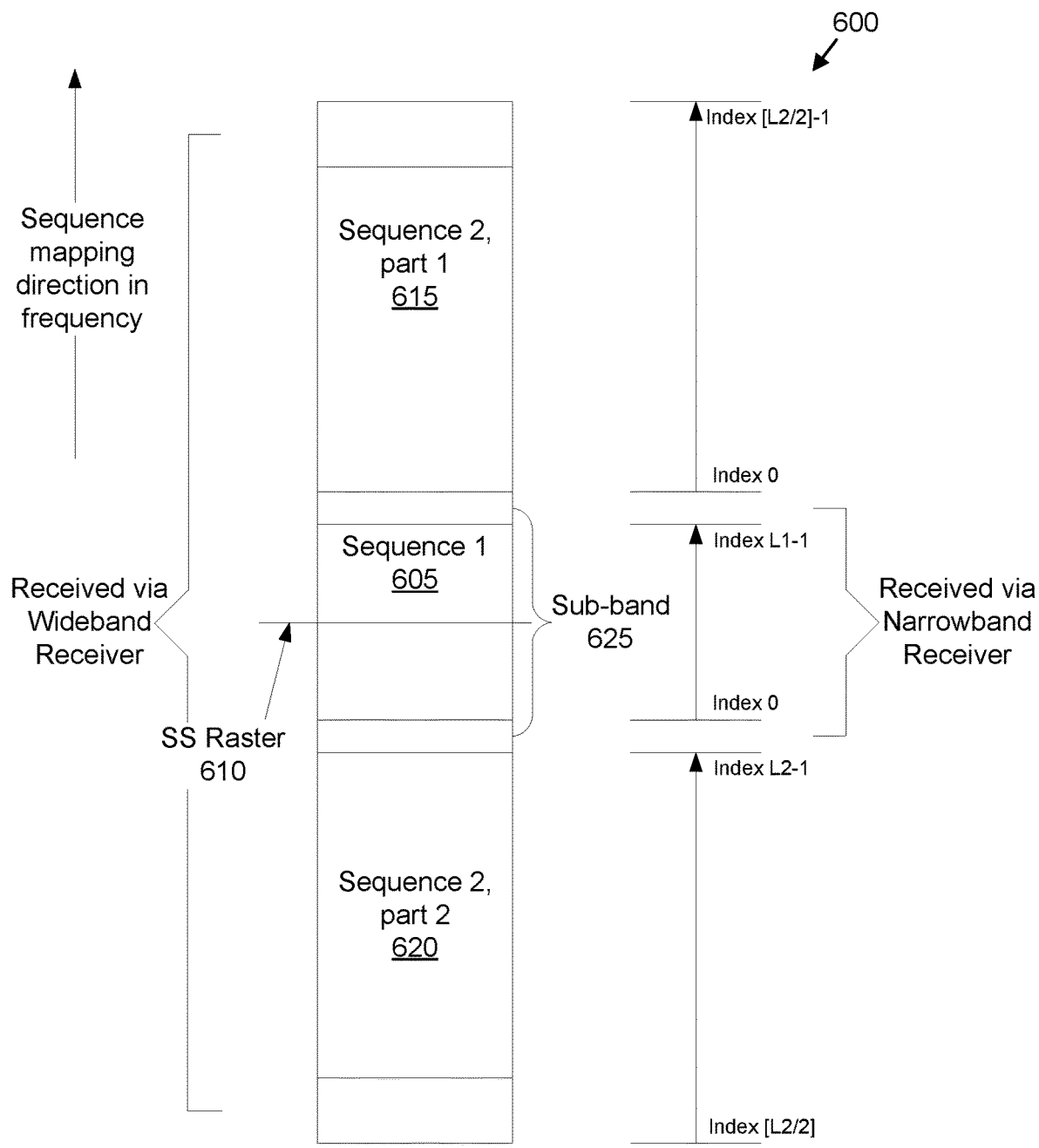
FIG. 6A is a block diagram illustrating one embodiment of a wideband SS burst.
Figure 6B:
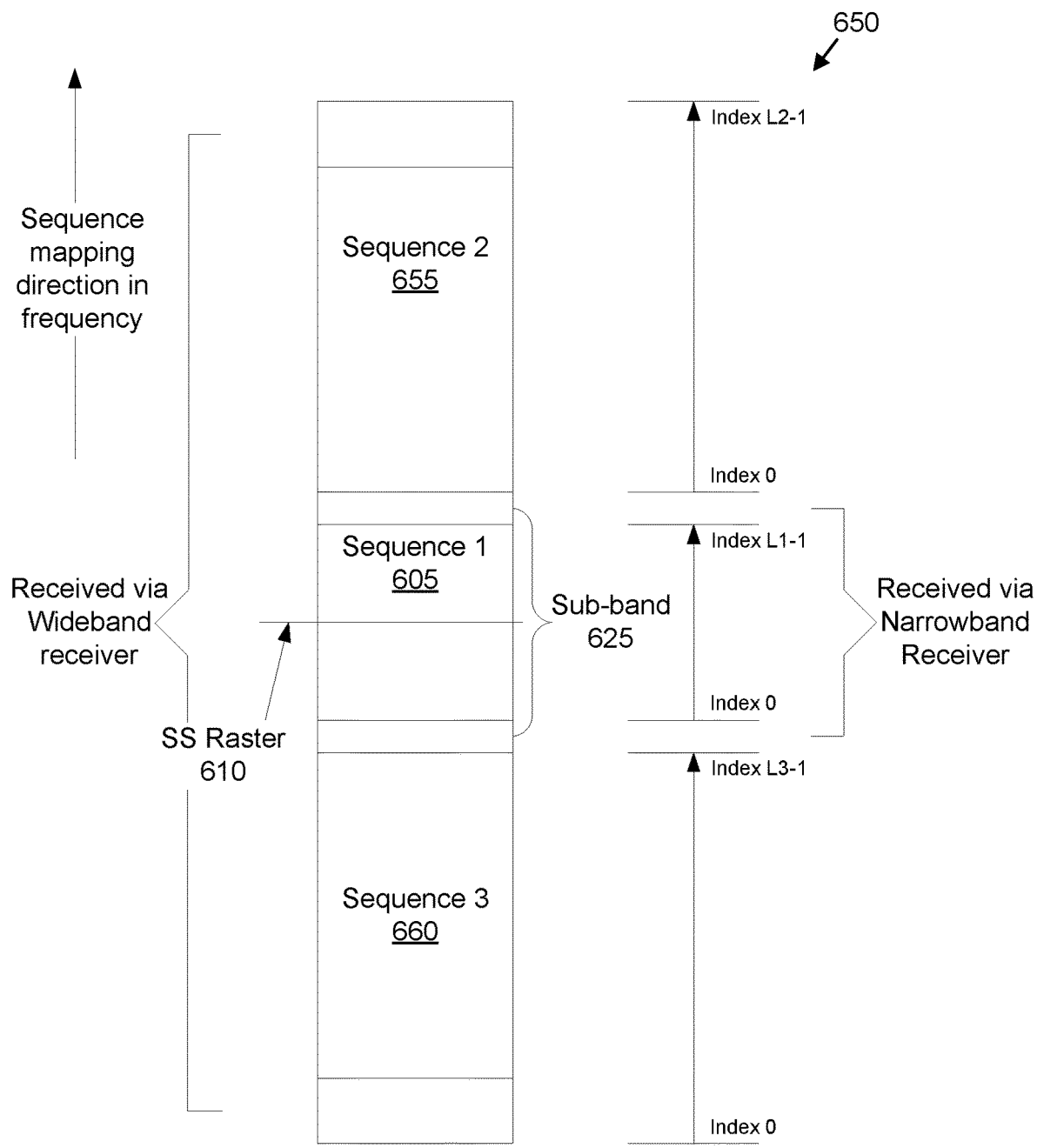
FIG. 6B is a block diagram illustrating another embodiment of a wideband SS burst.

FIGS. 6A and 6B depict wideband SS designs, according to embodiments of the disclosure. FIG. 6A depicts a wideband SS design 600 having two sequences, while FIG. 6B depicts a wideband SS design 650 having three sequences.

As shown in FIG. 6A, embodiments of the disclosure include a wideband SS design 600 having two Zadoff-Chu sequences, a first (narrowband) sequence 605 whose frequency range includes the SS raster frequency 610 and an additional (second) sequence split into a first part 615 and a second part 620. Here, the additional sequence is formed from a single, longer Zadoff-Chu sequence and split into two parts. Guard subcarriers exist between the first sequence 605 and the first part 615 and also between the first sequence 605 and the second part 620.

As depicted, the first part 615 may be located on (e.g., mapped to) frequencies above the first sequence 605 and the second part 620 may be located on (e.g., mapped to) frequencies below the first sequence 605. In one embodiment, the first part 615 of the additional sequence is mapped to a first frequency band with respect to the frequency location of the first (base) sequence 605, while the second part 620 of the additional sequence is mapped to a second frequency band with respect to the frequency location of the first sequence 605. In another embodiment, the additional sequence (as a whole) is circularly mapped to a first frequency band residing above the frequency location of the first sequence 605 to form the first part 615, while the second part 620 is circularly mapped to a second frequency band residing below (e.g., at lower frequencies) the frequency location of the first sequence 605 to form the second part 620.

The combination of the first sequence 605 and additional sequence (e.g., first part 615 and second part 620) form a wideband SS receivable by an eMBB UE using a wideband receiver. Moreover, the first sequence 605 alone is receivable as a narrowband SS using a narrowband receiver. Note that the wideband SS design 600 includes sufficient guard bands between the first sequence 605 and the first part 615 and also between the first sequence 605 and the second part 620 for operation of the narrowband receiver. Accordingly, both wideband and band-limited UEs are able to receive the same SS signal and perform cell detection using the wideband SS design 600.

As shown in FIG. 6B, other embodiments of the disclosure include a wideband SS design 650 having three sequences, the first (narrowband) sequence 605 whose frequency range includes the SS raster frequency 610, a second sequence 655, and a third sequence 660. The second sequence 655 and third sequence 660 are distinct Zadoff-Chu sequences, while the first part 615 and second part 620 are portions of the same, longer Zadoff-Chu sequence. Guard subcarriers exist between the first sequence 605 and the second sequence 655 and also between the first sequence 605 and the third sequence 660.

As depicted, the second sequence 655 may be located on frequencies above the first sequence 605, while the third sequence 660 may be located on frequencies below the first sequence 605. In other embodiments, the second sequence 655 may be located on frequencies below the first sequence 605, while the third sequence 660 may be located on frequencies above the first sequence 605. The combination of the first sequence 605, second sequence 655, and third sequence 660 form a wideband SS receivable using a wideband receiver. Note that the wideband SS design 600 includes sufficient guard bands between the first sequence 605 and the second sequence 655 and also between the first sequence 605 and the third sequence 660 for operation of the narrowband receiver.

The wideband SS designs 600, 650 support both band-limited UEs and enhanced mobile broadband UEs due to the inclusion of multiple sequences. A band-limited UE performs cell detection using the first sequence 605 which is designed and located to be receivable by a narrowband receiver. On the other hand, enhanced mobile broadband UEs (or other non-band-limited UEs) having a wideband receiver perform cell detection using the concatenated sequences (e.g., the first sequence 605 concatenated with either the first and second parts 615, 620 or the second sequence 655 and third sequence 660).

The first sequence 605 is transmitted (e.g., by the gNB 210) within a sub-band 625. In the depicted embodiments, the sub-band 625 is centered on the SS raster frequency location 610 (e.g., the center of the sub-band 625 corresponds to the SS raster frequency location 610). In certain embodiments, the bandwidth of the sub-band 625 may be determined by the minimum operating bandwidth capability of the band-limited UEs.

The wideband SS designs 600, 650 beneficially support both bandwidth limited UEs and normal (non-bandwidth limited) UEs without performance degradation, as shown below with reference to FIG. 8. In sum, the wideband SS designs 600, 650 significantly outperform conventional LTE PSS in missed detection probability performance and the multi-sequence concatenation based wideband PSS performs comparably to a single-long sequence based wideband PSS.

Table 1 shows example parameters for a two-sequence synchronization signal transmitted with the bandwidth wider than conventional LTE PSS/SSS bandwidth, such as the wideband SS design 600. Here, the transmission bandwidth of a wideband SS burst may be fixed in the frequency range and may additionally have predefined subcarrier spacing per frequency range. In some embodiments, the transmission bandwidth may change over different frequency ranges, such that different predefined subcarrier spacing values are associated with different frequency ranges.

TABLE 1

| Parameters | Values |
| --- | --- |
| Frequency range | <6 GHz |
| Subcarrier spacing for SS | 15 kHz |
| SS sequence length | First (base) sequence = 61, Second (additional) sequence = 167 |
| Transmission bandwidth for SS (excluding guard subcarriers in the edge of the concatenated SS) | 3.585 MHz |

Table 2 shows example parameters for a three-sequence synchronization signal transmitted with the bandwidth wider than conventional LTE PSS/SSS bandwidth, such as the wideband SS design 650. Again, the transmission bandwidth of a wideband SS burst may be fixed in the frequency range and may additionally have predefined subcarrier spacing per frequency range. Moreover, the transmission bandwidth may change over different frequency ranges, such that different predefined subcarrier spacing values are associated with different frequency ranges.

TABLE 2

| Parameters | Values |
| --- | --- |
| Frequency range | <6 GHz |
| Subcarrier spacing for SS | 15 kHz |

TABLE 2-continued

| Parameters | Values |
| --- | --- |
| SS sequence length | First (base) sequence = 61, Second sequence = 83, Third sequence = 83 |
| Transmission bandwidth for SS (excluding guard subcarriers in the edge of the concatenated SS) | 3.57 MHz |

Note that Tables 1 and 2 assume that one resource block ("RB") is equal to 12 subcarriers and frequency and one OFDM symbol duration in time. Here, the first sequence 605 is placed within six RBs (covering 72 subcarriers or 1.08 MHz bandwidth) and the SS is transmitted within 21 RBs (covering 252 subcarriers or 3.78 MHz bandwidth). As the sequence lengths are less than the number of allocated subcarriers (e.g., 61<72, (61+167)<252, and (61+83+83) <252), certain of the allocated subcarriers become guard subcarriers with no information being carried during the synchronization signal.

Figure 7:
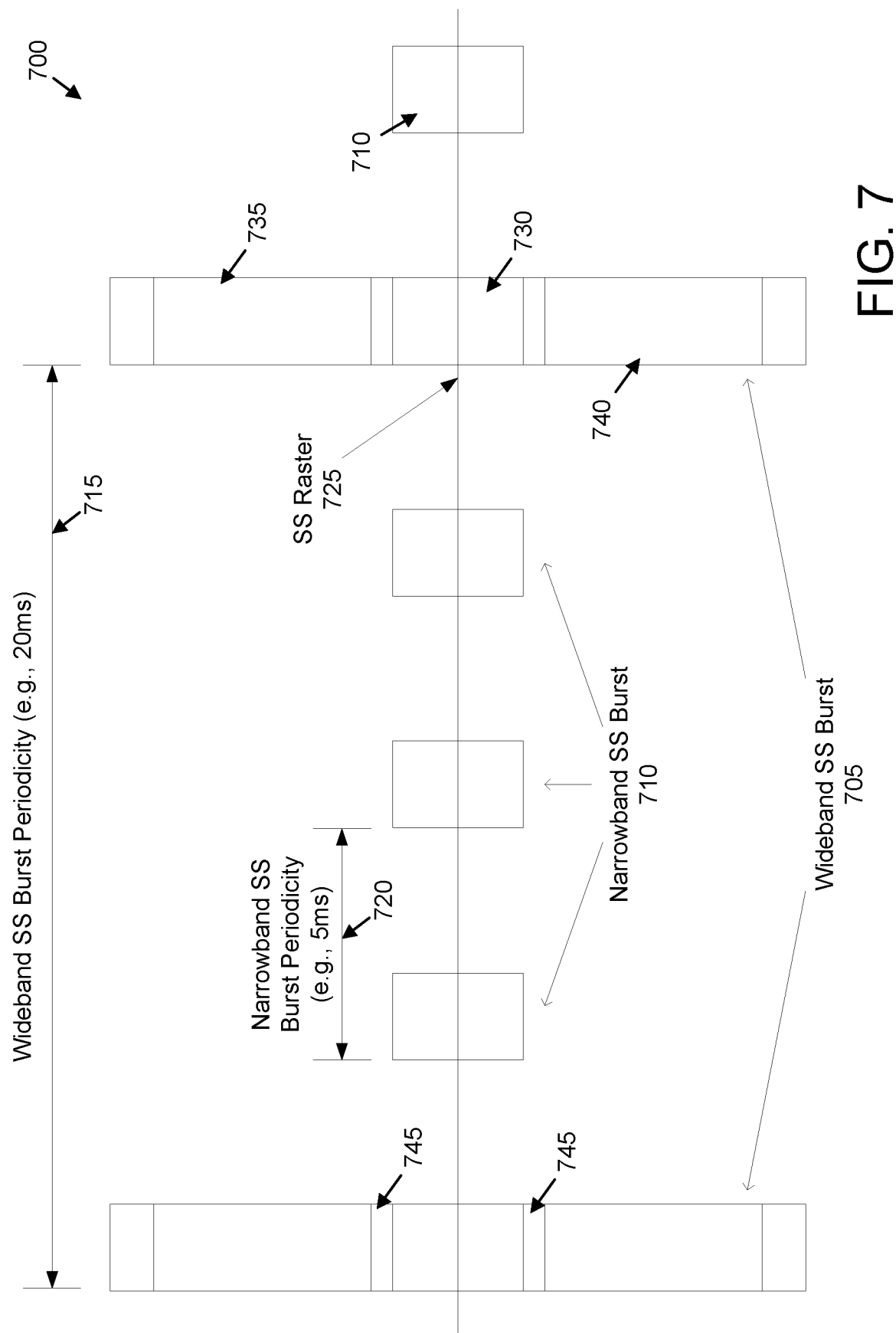
FIG. 7 is a block diagram illustration a transmission pattern of wideband SS burst and narrowband SS burst.

FIG. 7 depicts a transmission pattern 700 of wideband SS bursts 705 and narrowband SS bursts 710, according to embodiments of the invention. In one embodiment, the wideband SS bursts 705 are embodiments of the wideband SS design 600. In another embodiment, the wideband SS bursts 705 are embodiments of the wideband SS design 650. The wideband SS bursts 705 are transmitted centered on a SS raster frequency 725.

The narrowband SS bursts 710 may be embodiments of conventional LTE SS bursts, such as a PSS/SSS transmission. The narrowband SS bursts 710 are also transmitted centered on the SS raster frequency 725. Here, the narrowband SS burst 710 corresponds to a portion of the wideband SS bursts 705. Specifically, the narrowband SS burst 710 corresponds to a narrowband SS portion 730 of the wideband SS burst, such as the first sequence 605 discussed above with reference to FIGS. 6A and 6B. As depicted, each wideband SS burst 705 includes guard bands 745 between the narrowband SS portion 730 and the additional SS (here, a first additional SS 735 and a second additional SS 740).

Each wideband SS burst 705 may include, as content, a wideband PSS, a wideband SSS, and/or physical broadcast channel ("PBCH") carrying a master information block ("MIB") message. Additionally, each narrowband SS burst 710 may include a narrowband PSS and a narrowband SSS. In certain embodiments, a narrowband SS burst 710 may include a MIB message. Moreover, the narrowband PSS and the narrowband SSS may each correspond to a portion of the wideband PSS and a portion of the wideband SSS, respectively.

In certain embodiments, the gNB 210 may transmit a narrowband SS burst 710 and a wideband SS burst 705 with different periodicities, as depicted in FIG. 7. In the depicted embodiments, the wideband SS bursts 705 are transmitted with a wideband SS burst periodicity 715 of 20 ms. The narrowband SS bursts are transmitted with a narrowband SS burst periodicity 720 (5 ms) which is shorter than the wideband SS burst periodicity 715. Accordingly, transmission of each wideband SS burst 705 is interleaved with transmissions of one or more narrowband SS bursts 710.

By transmitting the narrowband SS burst 710 and wideband SS burst 705 with different periodicities, the gNB 210 guarantees similar cell detection latencies for all types of UEs, provides coverage extension benefit for band-limited UEs, while optimizing SS overhead. With this SS transmission structure, the SS monitoring periodicity may depend on the UE type. For example, band-limited UEs may use a 5 ms SS periodicity, while non-band-limited (e.g., "normal") UEs may use a 20 ms SS periodicity. However, in other embodiments the gNB 210 may transmit the narrowband SS burst 710 and the wideband SS burst 705 with the same periodicity.

Because a wider synchronization signal transmission bandwidth with a longer sequence results in better synchronization signal detection performance (e.g., for a given subcarrier spacing of SS and for a given per-subcarrier signal-to-noise ratio ("SNR")), the wideband SS designs 600, 650 require fewer instances for non-coherent accumulation in order for a UE to detect a cell. Thus, the wideband SS signal designs 600, 650 benefit from sparser transmissions in time than a narrowband SS transmission (e.g., a conventional LTE PSS/SSS transmission). Sparser transmissions in time amount to a longer SS periodicity and beneficially result in reduced SS overhead for a given target-detection latency.

In one embodiment, the PBCH is transmitted only on the wideband SS burst 705 (e.g., transmitted with longer periodicity, such as 20 ms). In such embodiments, the gNB 210 may transmit repeated PBCH for coverage extension around a slot when the wideband SS burst is transmitted. Moreover, a band-limited UE 205 may attempt decoding of PBCH every 5 ms to discover timing of the PBCH transmission occasions. Attempted decodings every 5 ms may also be used to discover the timing of the wideband SS burst occasions. After acquiring timing, the band-limited UE 205 attempts decoding of PBCH only when the SS burst with PBCH (e.g., the wideband SS burst) occurs.

In some embodiments, narrowband PSS/SSS in the narrowband SS burst 710 are the same as a part of the wideband PSS/SSS in the wideband SS burst 705. In other embodiments, the narrowband SSS in the narrowband SS burst is different than the corresponding portion of the wideband SSS in the wideband SS burst. In such embodiments, the narrowband PSS may be the same as the corresponding part of the wideband PSS.

In one embodiment, the narrowband SSS may be coded with a different scrambling code then the scrambling code used for the corresponding part of the wideband SSS. In another embodiment, the base SSS sequence may be perturbed (e.g., cyclically shifted) differently for the narrowband SSS then for the corresponding part of the wideband SSS. In yet another embodiment, the narrowband SSS may be both perturbed differently than the corresponding part wideband SSS and also coded with a different scrambling code. By coding/perturbing the narrowband SSS differently than the corresponding portion of wideband SSS, the gNB 210 provides additional timing information to the UE 205. Moreover, the different scrambling codes and/or perturbation amounts also indicate to the UE 205 whether the narrowband SS is part of a wideband SS burst or is a standalone narrowband SS burst.

The particular scrambling codes/sequences on the SSS, or the perturbations of the base SSS sequence, may be based on the slot index and/or the SS burst index. As used herein, the SS burst index indicates a timing offset from the slot where PBCH is transmitted. For example, the SS burst index for the SS burst coinciding with the PBCH is 0, the following SS burst has a SS burst index of 1, and so on until the next SS burst occasion that coincides with PBCH, at which point the SS burst index resets to 0. Note that in the above example, the band-limited UE 205 attempts PBCH decoding only when the SS burst index is 0. Moreover, the band-limited UE detecting a portion of the wideband SSS (differentiated from the narrowband SSS by scrambling code or sequence perturbation, as discussed above) may also trigger PBCH decoding.

While FIG. 7 shows both wideband SS bursts 705 and narrowband SS bursts 710, the gNB 210 may selectively turn on and off the narrowband SS bursts 710 depending on deployment scenarios. For example, if the gNB 210 is not supposed to serve band-limited UEs 205, then the gNB 210 does not transmit narrowband SS bursts 710, instead transmitting wideband SS bursts 705. As another example, the gNB 210 only transmits the narrowband SS bursts 710 for a particular duration at a specific time of the day. Here, band-limited UEs 205, such as mMTC UEs, are scheduled to be active during the specific time of the day corresponding to those times when the gNB 210 transmits the narrowband SS bursts 710. In a third example, the gNB 210 selectively turns on the narrowband SS bursts 710 in response to request from a band-limited UE 205. In this example, a band-limited UE 205 may initiate side-the communication (e.g., device-to-device communication) with a non-ban-limited UE 205 in order to send the gNB 210 a request to turn on the narrowband SS bursts 710.

Wideband-capable UEs 205 (e.g., eMBB UEs) may perform cell detection by searching for a wideband SS burst 705 with a predetermined periodicity (e.g., 20 ms). Once the wideband-capable UEs 205 detect the wideband SS burst 705, with acquisition of coarse timing and frequency information, they can discover the narrowband SS bursts 710 via network signaling or via blind detection. Using the narrowband SS bursts 710, the UEs 205 refine frequency estimation. In certain embodiments, the narrowband SS bursts 710 have a higher power spectral density than the wideband SS bursts 705. Here, the higher power spectral density aids band-limited UEs in cell detection.

Figure 8:
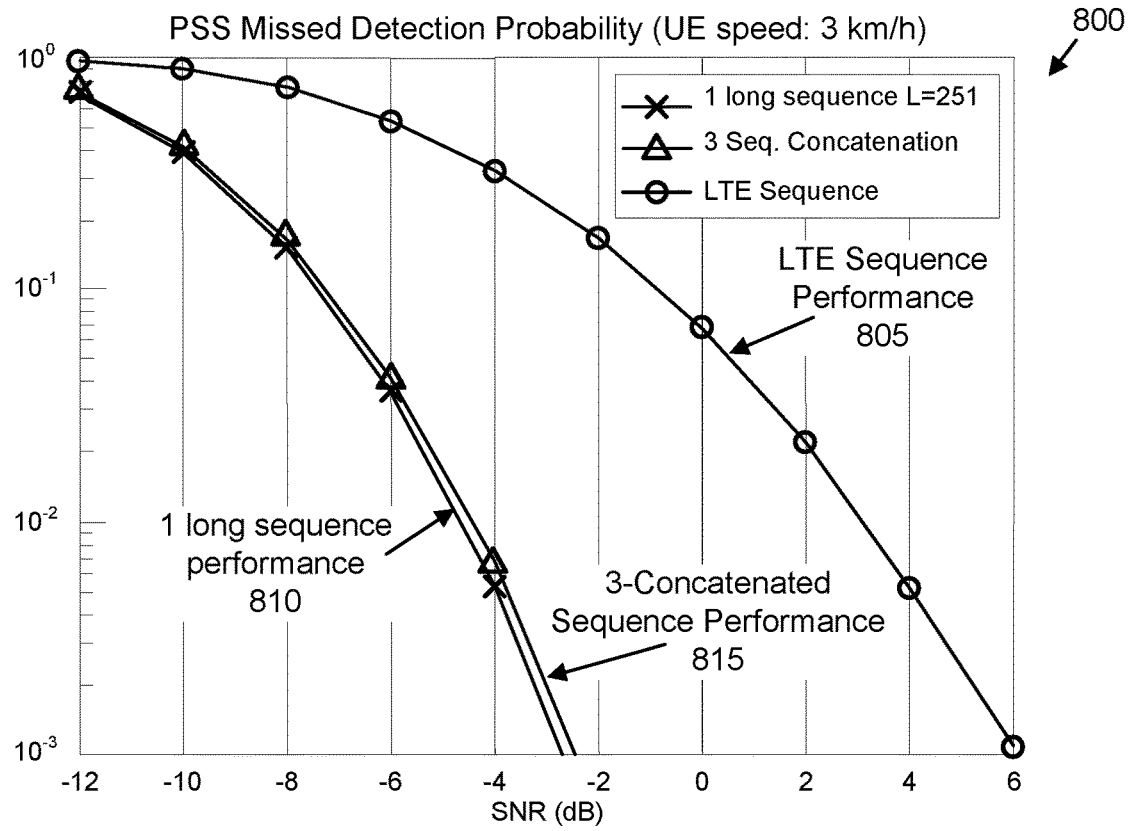
FIG. 8 is a diagram illustrating synchronization signal missed detection probabilities.
Figure 8:
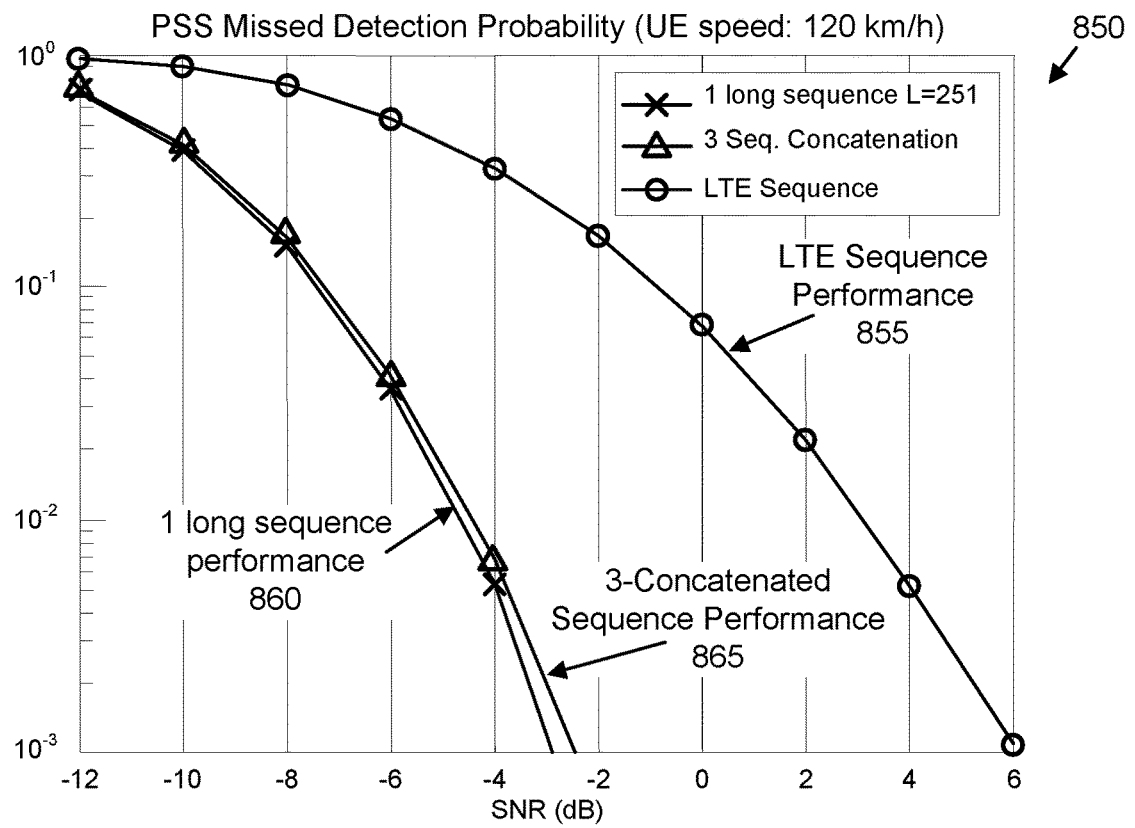

FIG. 8 contains a first graph 800 and a second graph 850, each illustrating primary synchronization signal missed detection probabilities, according to embodiments of the disclosure. The first graph 800 shows various probabilities of a UE missing PSS detection while traveling at 3 km/h (e.g., at low speed). The first graph 800 illustrates the simulation results for link-level performance evaluation of a conventional LTE PSS missed detection probability performance for a single, long sequence (here, L=251) 810, and PSS missed detection probability performance for three concatenated sequences 815, such as the wideband SS burst described with reference to FIG. 6B and using parameters discussed in Table 2.

As depicted, both wideband PSSs (having bandwidth approximately four times wider than the LTE PSS) significantly outperform the LTE PSS. For example, at 1% missed detection rate, both the single, long sequence performance 810 and the three-concatenated-sequence performance 815 show larger than 6 dB SNR gains over the conventional LTE performance 805. Moreover, the simulation results show that the three-concatenated-sequence performance 815 perform similarly to the single-long sequence performance 810. Note that the cell detection receiver complexity is approximately the same for both wideband PSSs.

The second graph 850 shows various probabilities of a UE missing PSS detection while traveling at 120 km/h (e.g., at high speed). The second graph 850 shows PSS missed detection probability performance for the conventional LTE sequence 855, PSS missed detection probability performance for the single, long sequence (here, L=251) 860, and PSS missed detection probability performance for the three concatenated sequences 865, such as the wideband SS burst described with reference to FIG. 6B and using parameters discussed in Table 2.

As depicted, both wideband PSSs (having bandwidth approximately four times wider than the LTE PSS) significantly outperform the LTE PSS. For example, at 1% missed detection rate, both the single, long sequence performance 860 and the three-concatenated-sequence performance 865 show larger than 6 dB SNR gains over the conventional LTE performance 855. Moreover, the simulation results show that the three-concatenated-sequence performance 865 perform similarly to the single-long sequence performance 860.

Employing single long sequence based wideband SS for both eMBB UEs and band limited (BL) UEs and BL UEs' using a part of wideband SS for cell detection would degrade cell detection performance of BL UEs, because a set of partial sequences extracted from a set of single long sequences have poor auto- and cross-correlation performance, compared to a set of short Zadoff-Chu (ZC) sequences. Beneficially, the two- and three-concatenated sequence wideband signals disclosed herein maintain auto- and cross-correlation performance, while outperforming LTE PSS in missed detection probability performance.

Figure 9:
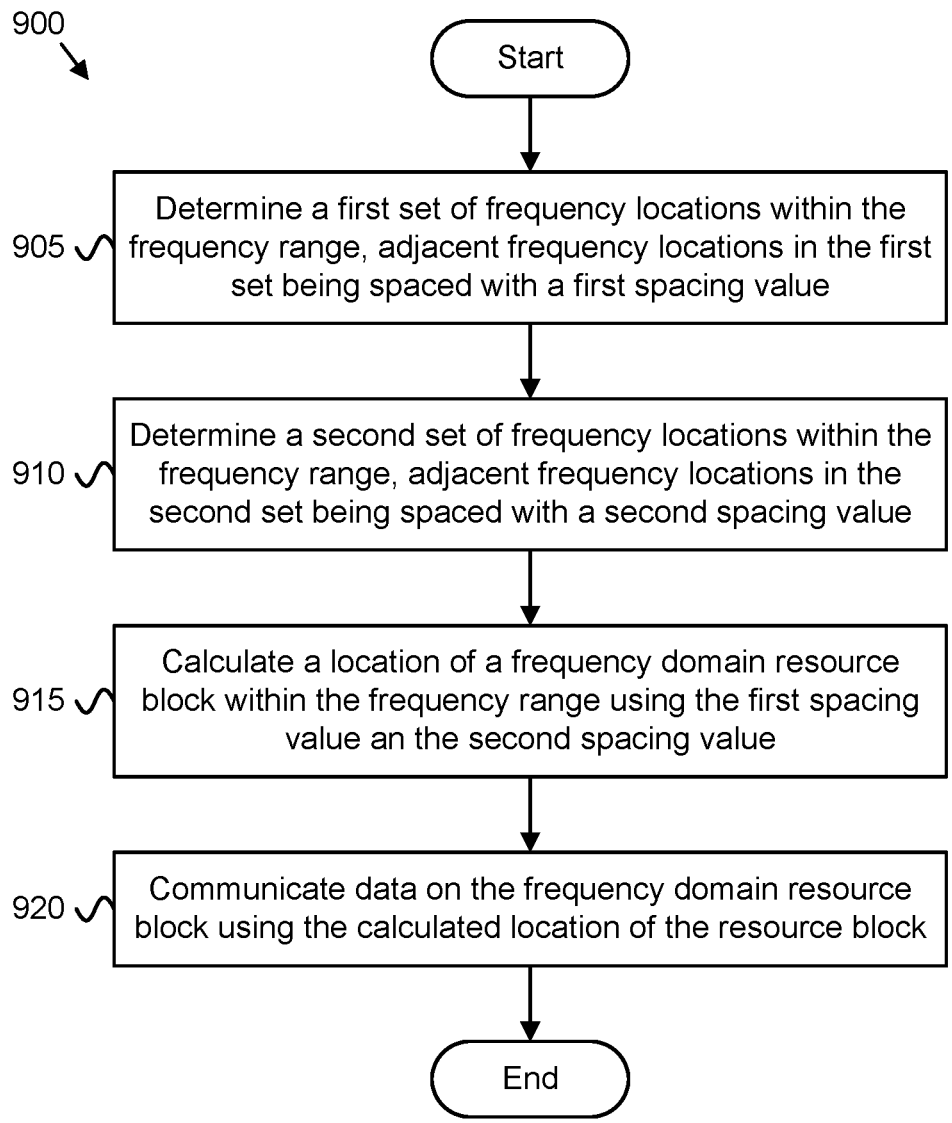
FIG. 9 is a schematic flow chart diagram illustrating one embodiment of a method for determining a location of a frequency-domain resource block using frequency spacing values.

FIG. 9 depicts a method 900 for determining a location of a frequency-domain resource block using frequency spacing values, according to embodiments of the disclosure. In some embodiments, the method 900 is performed by an apparatus, such as the remote unit 105, the UE 205, and/or the user equipment apparatus 300. In certain embodiments, the method 900 may be performed by a processor executing program code, for example, a microcontroller, a microprocessor, a CPU, a GPU, an auxiliary processing unit, a FPGA, or the like.

The method 900 begins and determines 905 a first set of frequency locations within a frequency range. In certain embodiments, the first set of frequency locations is a set of potential locations for detecting a synchronization signal ("SS"). Here, adjacent frequency locations in the first set of frequency locations are spaced with a first spacing value. In one embodiment, the first spacing value may depend on a location of the frequency range within a wireless spectrum and/or a geographical area of operation.

In certain embodiments, determining 905 the first set of frequency locations includes detecting the SS at a first frequency location in the first set of frequency locations. Moreover, detecting the SS may include receiving a wideband SS burst with a wideband receiver. Here, the wideband SS burst is transmitted with a first periodicity and comprises a first narrowband SS burst and an additional SS burst in frequency. In some embodiments, the wideband SS burst comprises at least one of: a wideband primary SS ("PSS"), a wideband secondary SS ("SSS"), and a physical broadcast channel ("PBCH") carrying a master information block ("MIB") message. In certain embodiments, the first narrowband SS burst comprises at least one of: a narrowband PSS, a narrowband SSS, and a PBCH carrying a MIB message. Additionally, determining 905 the first set of frequency locations may include detecting a cell based on one of: the first narrowband SS burst, and the wideband SS burst.

In some embodiments, detecting the SS may also include receiving the first narrowband SS burst with a second periodicity shorter than the first periodicity. In certain embodiments, receiving the first narrowband SS burst with a second periodicity shorter than the first periodicity comprises receiving a modified first narrowband SS burst whenever the first narrowband SS burst is transmitted without the additional SS burst. In such embodiments, the first narrowband SS burst may be modified by applying one or more of: a different scrambling code to a SS in the first narrowband SS burst and a cyclical shift to a SS in the first narrowband SS burst. Here, the modified first narrowband SS burst may have a higher power spectral density than the first narrowband SS burst transmitted with the additional SS burst.

The method 900 continues and determines 910 a second set of frequency locations within the same frequency range. Here, adjacent frequency locations in the second set of frequency locations are spaced with a second spacing value. In certain embodiments, the second set of frequency locations is a set of carrier raster locations within the frequency range. In some embodiments, the first spacing value is larger than the second spacing value.

In one embodiment, the second spacing value may depend on a location of the frequency range within a wireless spectrum and/or a geographical area of operation. In another embodiment, the second spacing value is a network configured value. For example, determining 910 the second set of frequency locations may include receiving the second spacing value from the network.

The method 900 includes calculating 915 a location of a frequency-domain resource using the first and second spacing values. Here, the frequency-domain resource location is determined in response to determining the first and second sets of frequency locations. In some embodiments, the location of the frequency-domain resource block is one of a starting resource block and an ending resource block of an allocation that includes the determined frequency-domain resource block.

In some embodiments, calculating 915 the location of the frequency-domain resource block comprises determining a resource block index for the frequency-domain resource block, and wherein communicating data on the frequency-domain resource block comprises communicating data on the frequency-domain resource block using the location of the determined resource block index.

In some embodiments, calculating 915 the location of the frequency-domain resource block includes decoding system information from a broadcast channel determining a frequency offset from the system information. In such embodiments, the location of the frequency-domain resource block is determined using the frequency offset. In certain embodiments, the frequency offset is calculated using the equation, $\Delta F_1 \cdot k + \Delta F_2 \cdot l$, where $\Delta F_1$ is the first spacing value, $\Delta F_2$ is the second spacing value, and k and l are information elements included in the system information.

The method 900 includes communicating 920 data on the frequency-domain resource block using the calculated location of the resource block. In one embodiment, communicating 920 data on the determined frequency-domain resource block includes receiving data from the base unit on the determined location. The method 900 ends.

Figure 10:
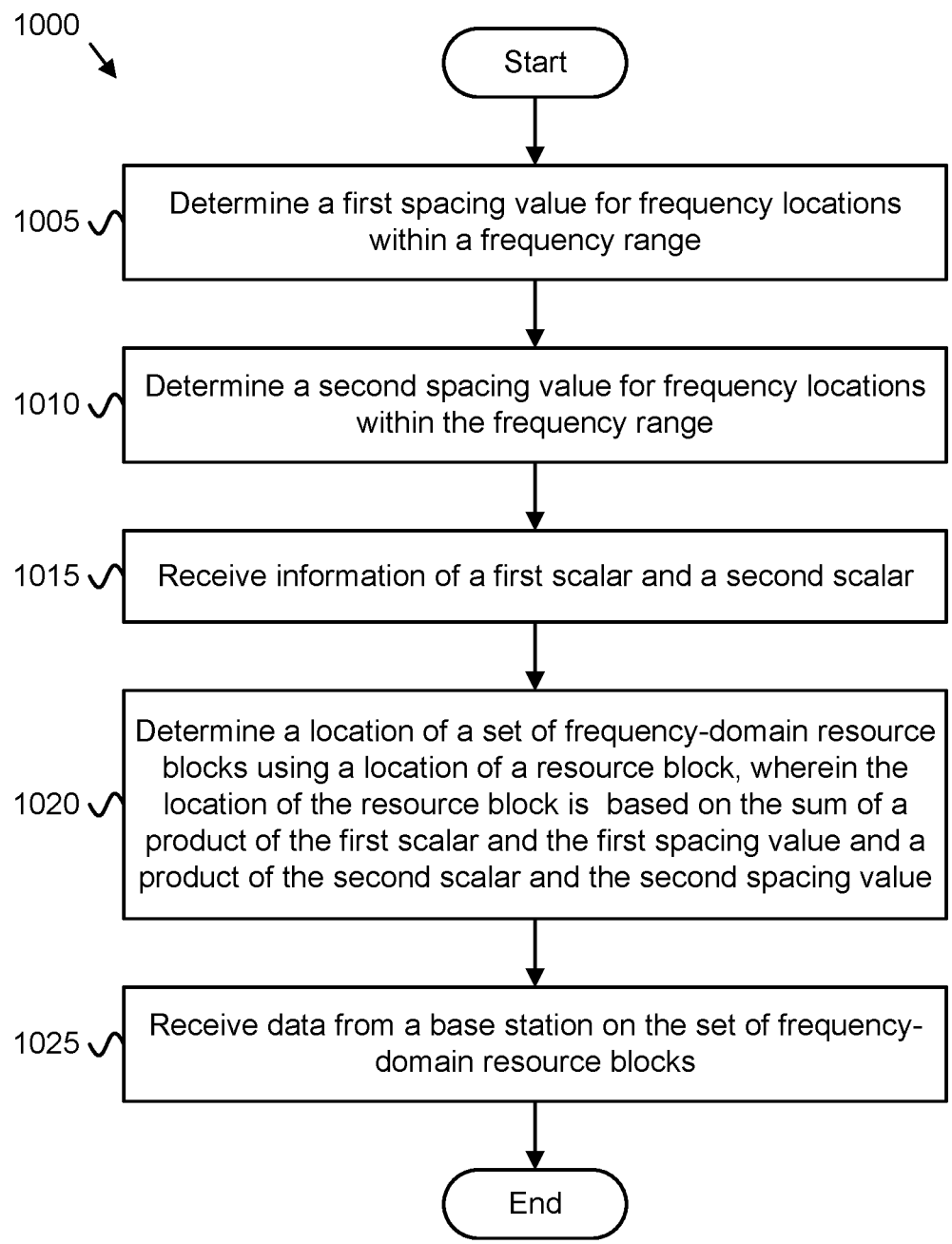
FIG. 10 is a schematic flow chart diagram illustrating one embodiment of another method for determining a location of a frequency-domain resource block using frequency spacing values.

FIG. 10 depicts a method 1000 for determining a location of a frequency-domain resource block using frequency spacing values, according to embodiments of the disclosure. In some embodiments, the method 1000 is performed by an apparatus, such as the remote unit 105, the UE 205, and/or the user equipment apparatus 300. In certain embodiments, the method 1000 may be performed by a processor executing program code, for example, a microcontroller, a microprocessor, a CPU, a GPU, an auxiliary processing unit, a FPGA, or the like.

The method 1000 begins and determines 1005 a first spacing value for frequency locations within a frequency range. In certain embodiments, the first spacing value corresponds to a set of potential locations for detecting a synchronization signal. In some embodiments, the first spacing value is based on a reference subcarrier spacing value for the frequency range. For example, the first spacing value may be based on 1RB bandwidth with a 15 kHz subcarrier spacing ("SCS") for a first Frequency Range ("FR1) or 1RB bandwidth with a 60 kHz SCS for a second Frequency Range ("FR2"). Note here that 1RB is comprised of 12 subcarriers; thus, in the above example, the first spacing value would be 180 kHz in FR1 based on the 15 kHz reference SCS value and would be 720 kHz in FR2 based on the 60 kHz reference SCS value.

In some embodiments, determining 1005 the first spacing value includes decoding system information from a broadcast channel (e.g., PBCH), wherein the first spacing value is indicated by a master information block ("MIB") of the system information. In certain embodiments, the amount of the first spacing value depends on a location of the frequency range within a wireless spectrum and/or on a geographical area of operation.

The method 1000 includes determining 1010 a second spacing value for frequency locations within the frequency range. In certain embodiments, the second spacing value corresponds to a set of carrier raster locations within the frequency range. In some embodiments, the second spacing value is a network-configured value, wherein determining 1010 the second spacing value includes receiving an indication of the second spacing value from the network (e.g., from the gNB or a core network function).

In some embodiments, determining 1010 the second spacing value includes decoding system information from a broadcast channel (e.g., PBCH), wherein the second spacing value is indicated by a master information block ("MIB") of the system information. In certain embodiments, the first spacing value is larger than the second spacing value. In certain embodiments, the amount of the second spacing value depends on a location of the frequency range within a wireless spectrum and/or on a geographical area of operation.

In a first solution, the first spacing value corresponds to 1RB bandwidth (i.e., based on a SCS value indicated by MIB) and the second spacing value corresponds to the SCS value indicated by MIB for FR2, i.e., using parameter "subCarrierSpacingCommon".

In a second solution, the first spacing value corresponds to 1RB bandwidth (i.e., based on the reference SCS for the frequency band) and the second spacing value corresponds to either 15 kHz for FR1 or a SCS value indicated by MIB for FR2.

The method 1000 includes receiving 1015 information of a first scalar and a second scalar. In various embodiments, the values of the first scalar and second scalar are indicated by system information, e.g., indicated by a master information block ("MIB") of the system information. In certain embodiments, the first scalar is the RB offset in MIB (e.g., indicated via parameter "pdcch-ConfigSIB1")−1. In certain embodiments, the first scalar is the offset to "Point A," where "Point A" serves as a common reference point for resource block grids. In certain embodiments, the second scalar is 12−k_ssb (indicated via parameter "ssb-SubcarrierOffset" in MIB). In certain embodiments, the second scalar is the value of k_ssb. Here, the quantity k_ssb may represent a subcarrier offset from subcarrier 0 in a given common resource block to subcarrier 0 of the SS/PBCH block.

In some embodiments, the first scalar corresponds to a frequency offset value indicating an offset between a reference frequency location and a frequency location associated with a synchronization signal. In further embodiments, the first scalar value may be a network-configured value (e.g., received from the gNB and/or a core NF).

The method 1000 includes determining 1020 a location of a set of frequency-domain resource blocks using a location of a resource block, wherein the location of the reference resource block is based on the sum of a product of the first scalar and the first spacing value and a product of the second scalar and the second spacing value. In some embodiments, the reference resource block corresponds to a resource block with a smallest resource block index value in the set of frequency-domain resource blocks.

In some embodiments, determining 1020 the location includes detecting a synchronization signal, determining a frequency location of the detected synchronization signal, and determining a frequency offset, wherein the location of the reference resource block is calculated by applying the frequency offset to the determined frequency location. In such embodiments, the frequency offset may be calculated by, $\Delta F_1 \cdot k + \Delta F_2 \cdot l$, where $\Delta F_1$ is the first spacing value, $\Delta F_2$ is the second spacing value, k is the first scalar, and l is the second scalar, wherein information of k and l is indicated by the system information decoded from a broadcast channel.

According to the first solution, the first scalar may correspond to: [the RB offset in MIB (i.e., indicated via parameter "pdcch-ConfigSIB1")−1]; and the second scalar corresponds to: [12−k_ssb (i.e., indicated via parameter "ssb-SubcarrierOffset")]. In such embodiments, the reference resource block corresponds to the RB corresponding to the smallest RB index of a control region (e.g., the controlresource set) for Type0-PDCCH CSS.

According to the second solution, the first scalar may correspond to the value indicated by parameter offsetToPointA (e.g., indicated via system information or network signaling) and the second scalar may correspond to k_ssb (i.e., indicated via parameter "ssb-SubcarrierOffset"). In such embodiments, the reference resource block corresponds to the CRB0, i.e., the first common resource block in a carrier bandwidth.

The method 1000 includes receiving 1025 data from a base station on the set of frequency-domain resource blocks. The method 1000 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining a first spacing value for frequency locations within a frequency range;
   determining a second spacing value for frequency locations within the frequency range;
   receiving information of a first scalar and a second scalar;
   determining a location of a set of frequency-domain resource blocks using a location of a resource block, wherein the location of the resource block is based on the sum of a product of the first scalar and the first spacing value and a product of the second scalar and the second spacing value; and
   receiving data from a base station on the set of frequency-domain resource blocks.

2. The method of claim 1,
   wherein the first spacing value corresponds to a set of potential locations for detecting a synchronization signal, and wherein the second spacing value corresponds to a set of carrier raster locations within the frequency range.

3. The method of claim 1, further comprising
decoding system information from a broadcast channel, wherein the first spacing value and second spacing value are indicated by a master information block of the system information.

4. The method of claim 1, further comprising
detecting a synchronization signal;
determining a frequency location of the detected synchronization signal;
determining a frequency offset from system information decoded from a broadcast channel,
wherein the frequency offset is calculated by, $\Delta F_1 \cdot k + \Delta F_2 \cdot l$, where $\Delta F_1$ is the first spacing value, $\Delta F_2$ is the second spacing value, k is the first scalar, and l is the second scalar, wherein information of k and l is indicated by the system information, and
wherein the location of the resource block is calculated by applying the frequency offset to the determined frequency location.

5. The method of claim 1, wherein the resource block corresponds to a resource block with a smallest resource block index value of the set of frequency-domain resource blocks.

6. The method of claim 1, wherein the first spacing value is larger than the second spacing value, and wherein the first and second spacing values depend on one of: a location of the frequency range within a wireless spectrum and a geographical area of operation.

7. The method of claim 1, further comprising
receiving the second spacing value from the network, wherein the second spacing value is a network-configured value.

8. The method of claim 1, wherein the first spacing value is based on a reference subcarrier spacing for the frequency range.

9. The method of claim 8, further comprising
decoding system information from a broadcast channel, wherein the second spacing value and second scalar are indicated by a master information block of the system information.

10. The method of claim 9, wherein the first scalar corresponds to a frequency offset value between a reference frequency location and a frequency location associated with a synchronization signal, wherein the first scalar value is a network-configured value.

11. An apparatus comprising:
a transceiver that communicates with a base unit in a mobile communication network; and
a processor that:
determines a first spacing value for frequency locations within a frequency range;
determines a second spacing value for frequency locations within the frequency range;
receives information of a first scalar and a second scalar;
determines a location of a set of frequency-domain resource blocks using a location of a resource block, wherein the location of the resource block is based on the sum of a product of the first scalar and the first spacing value and a product of the second scalar and the second spacing value; and
receives data from a base station on the set of frequency-domain resource blocks.

12. The apparatus of claim 11,
wherein the first spacing value corresponds to a set of potential locations for detecting a synchronization signal, and
wherein the second spacing value corresponds to a set of carrier raster locations within the frequency range.

13. The apparatus of claim 11, wherein the processor further
decodes system information from a broadcast channel, wherein the first spacing value and second spacing value are indicated by a master information block of the system information.

14. The apparatus of claim 11, wherein the processor further
detects a synchronization signal;
determines a frequency location of the detected synchronization signal;
determines a frequency offset from system information decoded from a broadcast channel,
wherein the frequency offset is calculated by, $\Delta F_1 \cdot k + \Delta F_2 \cdot l$, where $\Delta F_1$ is the first spacing value, $\Delta F_2$ is the second spacing value, k is the first scalar, and l is the second scalar, wherein information of k and l is indicated by the system information, and
wherein the location of the resource block is calculated by applying the frequency offset to the determined frequency location.

15. The apparatus of claim 11, wherein the resource block corresponds to a resource block with a smallest resource block index value of the set of frequency-domain resource blocks.

16. The apparatus of claim 11, wherein the first spacing value is larger than the second spacing value, and wherein the first and second spacing values depend on one of: a location of the frequency range within a wireless spectrum and a geographical area of operation.

17. The apparatus of claim 11, wherein the second spacing value is a network-configured value, the transceiver receiving the second spacing value from the network.

18. The apparatus of claim 11, wherein the first spacing value is based on a reference subcarrier spacing for the frequency range.

19. The apparatus of claim 18, wherein the processor further
decodes system information from a broadcast channel, wherein the second spacing value and second scalar are indicated by a master information block of the system information.

20. The apparatus of claim 19, wherein the first scalar corresponds to a frequency offset value between a reference frequency location and a frequency location associated with a synchronization signal, wherein the first scalar value is a network-configured value.

* * * * *